US011619718B2

(12) United States Patent
Hosseini et al.

(10) Patent No.: US 11,619,718 B2
(45) Date of Patent: Apr. 4, 2023

(54) INTEGRATED OPTICAL STRUCTURES FOR LIDAR AND OTHER APPLICATIONS EMPLOYING MULTIPLE DETECTORS

(71) Applicant: Analog Photonics LLC, Boston, MA (US)

(72) Inventors: Ehsan Hosseini, Milton, MA (US); Michael Watts, Hingham, MA (US); Christopher Poulton, Boston, MA (US); Matthew Byrd, Arlington, MA (US); Diedrik Vermeulen, Boston, MA (US); Peter Russo, Boston, MA (US)

(73) Assignee: Analog Photonics LLC, Boston, MA (US)

( * ) Notice: Subject to any disclaimer, the term of this patent is extended or adjusted under 35 U.S.C. 154(b) by 0 days.

(21) Appl. No.: 17/557,401

(22) Filed: Dec. 21, 2021

(65) Prior Publication Data

US 2022/0113389 A1 Apr. 14, 2022

Related U.S. Application Data

(63) Continuation of application No. 16/009,915, filed on Jun. 15, 2018, now Pat. No. 11,243,296.

(60) Provisional application No. 62/520,271, filed on Jun. 15, 2017.

(51) Int. Cl.
*G01S 7/4863* (2020.01)
*G01S 7/481* (2006.01)
*G01S 17/42* (2006.01)
*G01S 17/34* (2020.01)

(52) U.S. Cl.
CPC .......... *G01S 7/4863* (2013.01); *G01S 7/4814* (2013.01); *G01S 7/4816* (2013.01); *G01S 7/4817* (2013.01); *G01S 17/42* (2013.01); *G01S 17/34* (2020.01)

(58) Field of Classification Search
CPC ...... G01S 7/4863; G01S 7/4817; G01S 17/34; G01S 17/42; G01S 7/4816; G01S 7/4814
USPC ........................................................ 356/4.01
See application file for complete search history.

(56) References Cited

U.S. PATENT DOCUMENTS

| | | |
|---|---|---|
| 4,099,879 A | 7/1978 | Britz |
| 4,548,464 A | 10/1985 | Auracher et al. |
| 4,950,880 A | 8/1990 | Hayner |
| 5,093,563 A | 3/1992 | Small et al. |
| 5,165,104 A | 11/1992 | Weverka |
| 6,548,801 B1 | 4/2003 | Sorin et al. |
| 6,608,669 B2 | 8/2003 | Holton |
| 7,755,533 B2 | 7/2010 | Harris et al. |
| 7,821,619 B2 | 10/2010 | Krikorian et al. |
| 9,476,981 B2 | 10/2016 | Yaacobi et al. |
| 9,709,668 B1 | 7/2017 | Kondratko et al. |
| 9,995,581 B2 | 6/2018 | Yoo |
| 10,000,000 B2 | 6/2018 | Marron |
| 10,061,125 B2 | 8/2018 | Hajimir et al. |
| 10,191,145 B2 | 1/2019 | Swanson |
| 2004/0246604 A1 | 12/2004 | Fiete et al. |
| 2009/0270983 A1 | 10/2009 | Fiala et al. |
| 2014/0376001 A1 | 12/2014 | Swanson |

(Continued)

*Primary Examiner* — Daniel L Murphy
(74) *Attorney, Agent, or Firm* — Young Basile Hanlon & MacFarlane, P.C.

(57) ABSTRACT

Aspects of the present disclosure describe systems, methods, and structures—including LiDAR—that employ multiple detectors that may determine multiple incident angles of multiple received radiation beams and advantageously do not require or employ phase shifters in illustrative embodiments and may instead—employ optical Fourier transform structures.

14 Claims, 21 Drawing Sheets

(56) References Cited

U.S. PATENT DOCUMENTS

| | | |
|---|---|---|
| 2015/0293224 A1 | 10/2015 | Eldada et al. |
| 2015/0370175 A1 | 12/2015 | Nicolaides et al. |
| 2016/0011312 A1 | 1/2016 | Leyva |
| 2016/0161600 A1 | 6/2016 | Eldada et al. |
| 2017/0299697 A1 | 10/2017 | Swanson |
| 2017/0350965 A1 | 12/2017 | Schmalenberg |

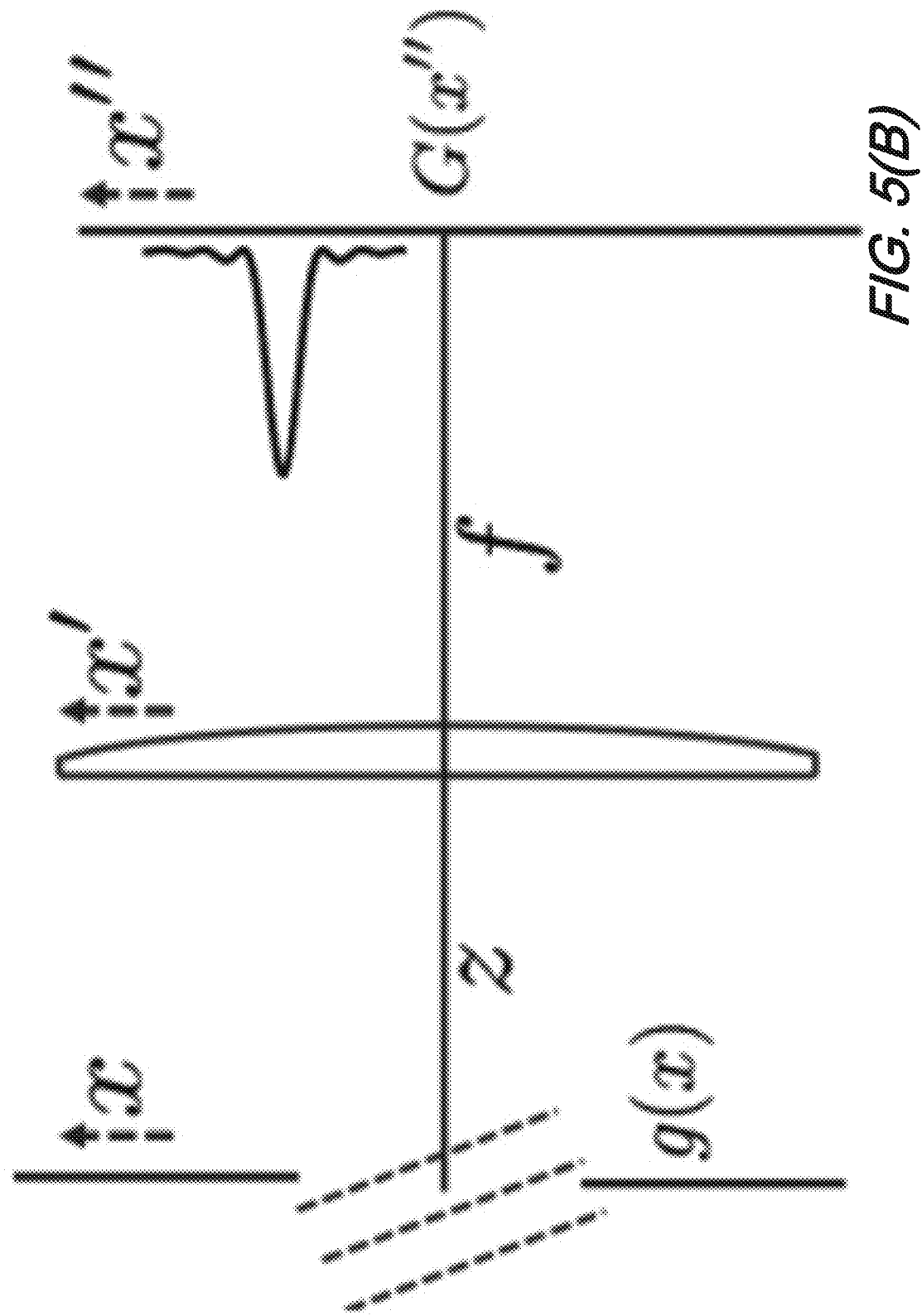

INTEGRATED OPTICAL STRUCTURES FOR LIDAR AND OTHER APPLICATIONS EMPLOYING MULTIPLE DETECTORS

CROSS REFERENCE TO RELATED APPLICATIONS

This application is a continuation of U.S. patent application Ser. No. 16/009,915 filed Jun. 15, 2018, which claims the benefit of United States Provisional Patent Application Ser. No. 62/520,271 filed Jun. 15, 2017, each of which is incorporated by reference as if set forth at length herein.

STATEMENT AS TO FEDERALLY SPONSORED RESEARCH

This invention was made with government support under the following contract: DARPA Contract No. HR0011-16-C-0108. The government has certain rights in the invention.

TECHNICAL FIELD

This disclosure relates generally to integrated optical systems, methods, and structures useful—for example—in applications involving imaging, ranging, sensing, and optical communications.

BACKGROUND

As is known, the ability to precisely direct radiation beams at a desired area/angle and detect backscattered radiation is of considerable importance to many contemporary technologies including—but not limited to—imaging, ranging, sensing, measuring, detecting, and communications, which—in turn—find widespread applicability in scientific and medical instruments and systems, vehicular safety and control, robotic navigation, and optical communications.

One particularly noteworthy system employing the precise direction/detection of radiation beams is a LiDAR system. As presently provided in the art however, such LiDAR systems with conventional optical phased arrays typically employ optical phase shifters which are known to require an undesirably high-power budget, are optically lossy, and oftentimes require a large I/O count in implementation.

SUMMARY

An advance in the art is made according to aspects of the present disclosure directed to systems, methods, and structures—including integrated photonics LiDAR—that may need to simultaneously determine incident angles of multiple received radiation beams.

In sharp contrast to the prior art—systems, methods, and structures according to aspects of the present disclosure advantageously do not require or employ active phase shifters in illustrative embodiments.

Viewed from one aspect, systems, methods, and structures according to aspects of the present disclosure may include an illustrative integrated optical device comprising: a emitter structure configured to emit optical radiation into an interrogation region; a plurality of collector structures configured to collect the emitted optical radiation backscattered from objects located in the interrogation region; a plurality of coherent receiver structures, a respective one for each individual collector structure, each respective coherent receiver structure configured to receive the backscattered optical radiation collected by its respective collector structure and produce signals indicative of the phase and amplitude of the received optical radiation; and a processing structure configured to digitally determine an offset angle to the objects using the phases and amplitudes of the received optical radiation.

Viewed from another aspect, systems, methods and structures according to aspects of the present disclosure may include an illustrative optical device comprising: an emitter structure configured to emit optical radiation into an interrogation region; a plurality of collector structures configured to collect the emitted optical radiation, backscattered from objects located in the interrogation region; an optical Fourier transform structure that projects a Fourier transform of the collected optical radiation; and a plurality of receiver structures, each receiver structure configured to receive a portion of the transformed optical radiation.

Finally, and viewed from yet another aspect, systems, methods and structures according to aspects of the present disclosure may include an illustrative optical device that advantageously provides a transform of optical radiation and may illustratively include: a plurality of input waveguides; a plurality of output waveguides; and a slab waveguide interposed between the input waveguides and the output waveguides wherein the optical structure is configured to impart a focusing phase front on optical field traversing the structure.

BRIEF DESCRIPTION OF THE DRAWING

A more complete understanding of the present disclosure may be realized by reference to the accompanying drawing in which:

FIG. 5(A) and FIG. 5(B) are a schematic diagrams of illustrative lens configurations wherein the lens is a Fourier transform device according to aspects of the present disclosure;

Figure 1:
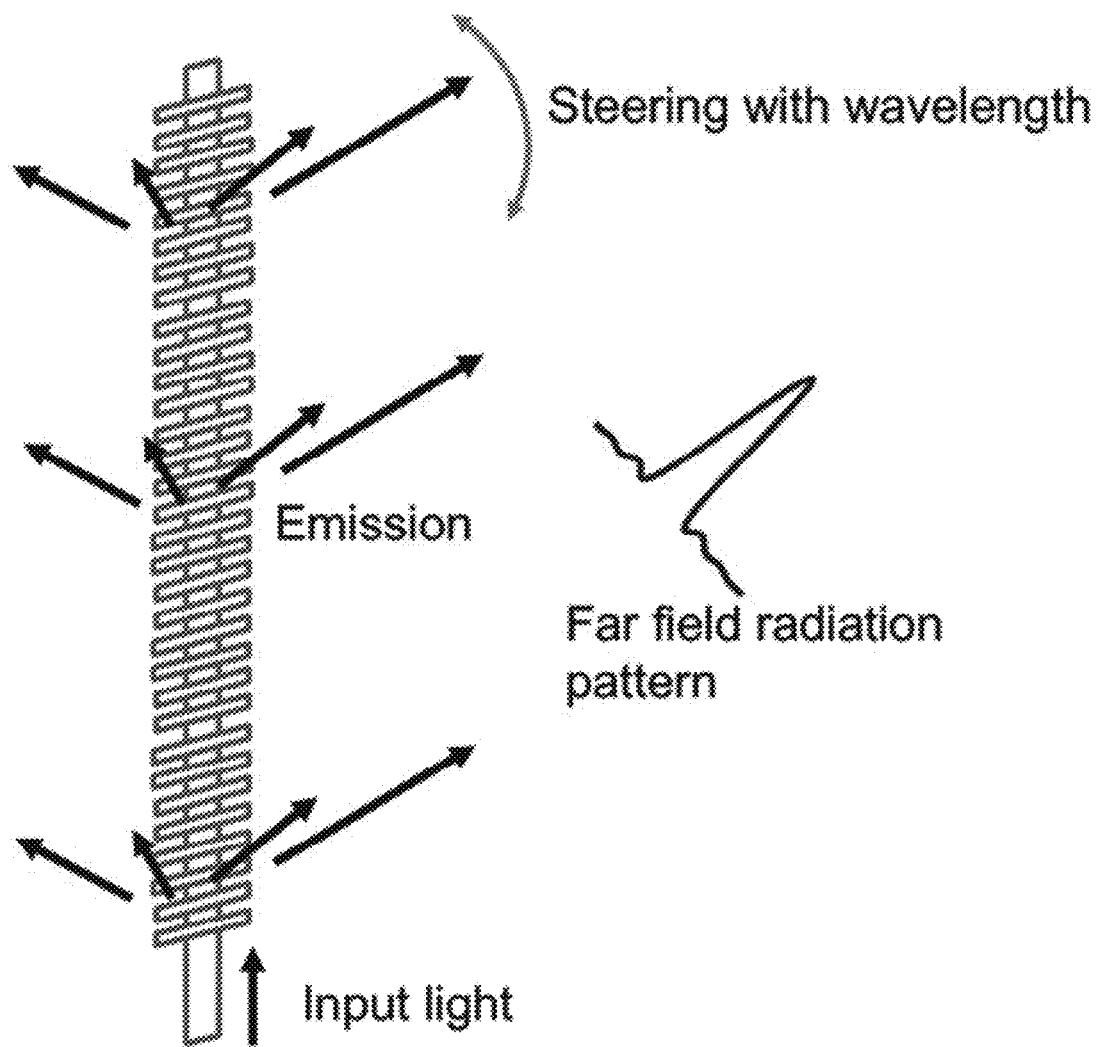
FIG. 1 is a schematic diagram showing an illustrative send/receive operation for an antenna system wherein emission patterns in the vertical direction may be adjusted by changing wavelength according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that integrated optical structures have attracted considerable attention for many applications including imaging, ranging, sensing, free-space communications, etc. This interest has further accelerated given recent utilization of advanced lithography and etching techniques originally developed for CMOS applications to the fabrication of such integrated optical structures.

Known further, phase shifters employed in contemporary optical systems require a relatively high, disadvantageous power budget or can have high optical loss. Eliminating the need for such phase shifters would represent a welcome addition to the art.

Accordingly, we disclose systems, methods, and structures that do not require active optical phase shifters to determine angles of received light (radiation). As will be readily appreciated by those skilled in the art, such systems, methods, and structures according to the present disclosure require much lower power and loss than those prior art systems employing active phase shifters.

As we shall show and describe, we disclose illustrative LiDAR systems to demonstrate our inventive concepts. We note that while we are using LiDAR illustratively, our disclosure is not so limited or exclusive to LiDAR applications and may find applicability in imaging, ranging, sensing, and optical communications. Note further that systems, methods, and structures according to aspects of the present disclosure may include integrated optical structures that may advantageously be CMOS-fabrication compatible, silicon nano-photonics.

In presenting our disclosure, we begin by noting that an illustrative coherent LiDAR system according to aspects of the present disclosure may include one or more antennae for emitting optical radiation and multiple antennae for collecting backscattered optical radiation. According to aspects of the present disclosure, in an illustrative coherent LiDAR system having a single emitter and multiple collectors, light is emitted from a single emitting antenna or, alternatively, from an optical phased array, into an interrogation area (environment) where it may strike objects and be backscattered from those objects and subsequently collected by multiple receiving collectors. The collecting antennae are in turn optically connected to a respective coherent receiver which produces signals indicative of the phase and amplitude of the backscattered light collected by the respective collector. These signals are subsequently processed such that an angle, and potentially distance, to the object from which light is backscattered. Of particular advantage, multiple objects may be simultaneously detected and their distance(s) and angle(s) relative to the emitter may be determined.

Illustratively, the emitter structure depicted in FIG. 1 comprises waveguide grating antennae having a large aperture in the longitudinal direction. As illustrated, the direction of emission of the optical radiation in the vertical direction may be advantageously adjusted by changing the wavelength of the optical radiation. Note that while this figure shows an illustrative, waveguide grating antennae, emitter structures employed may include an optical grating, an end-fire facet, a plasmonic emitter, a metal antenna, or mirror facet—among others.

The far field pattern (Fraunhofer range) of the emitted optical radiation will be understood by those skilled in the art to be the Fourier transform of the near field emission. For a relatively long and narrow emitter structure like that illustrated in FIG. 1, a substantially horizontal emission line in the far field results. Advantageously, such emission covers a large, one-dimensional angular range such that multiple objects along this line of angles are illuminated by the emitted optical radiation. As noted above, the grating emission angle depends on the wavelength of the guided light and the period of the grating features. Because of the grating response characteristics, changing the wavelength of the input optical energy steers the line across the field of view in the perpendicular direction.

Figure 2:
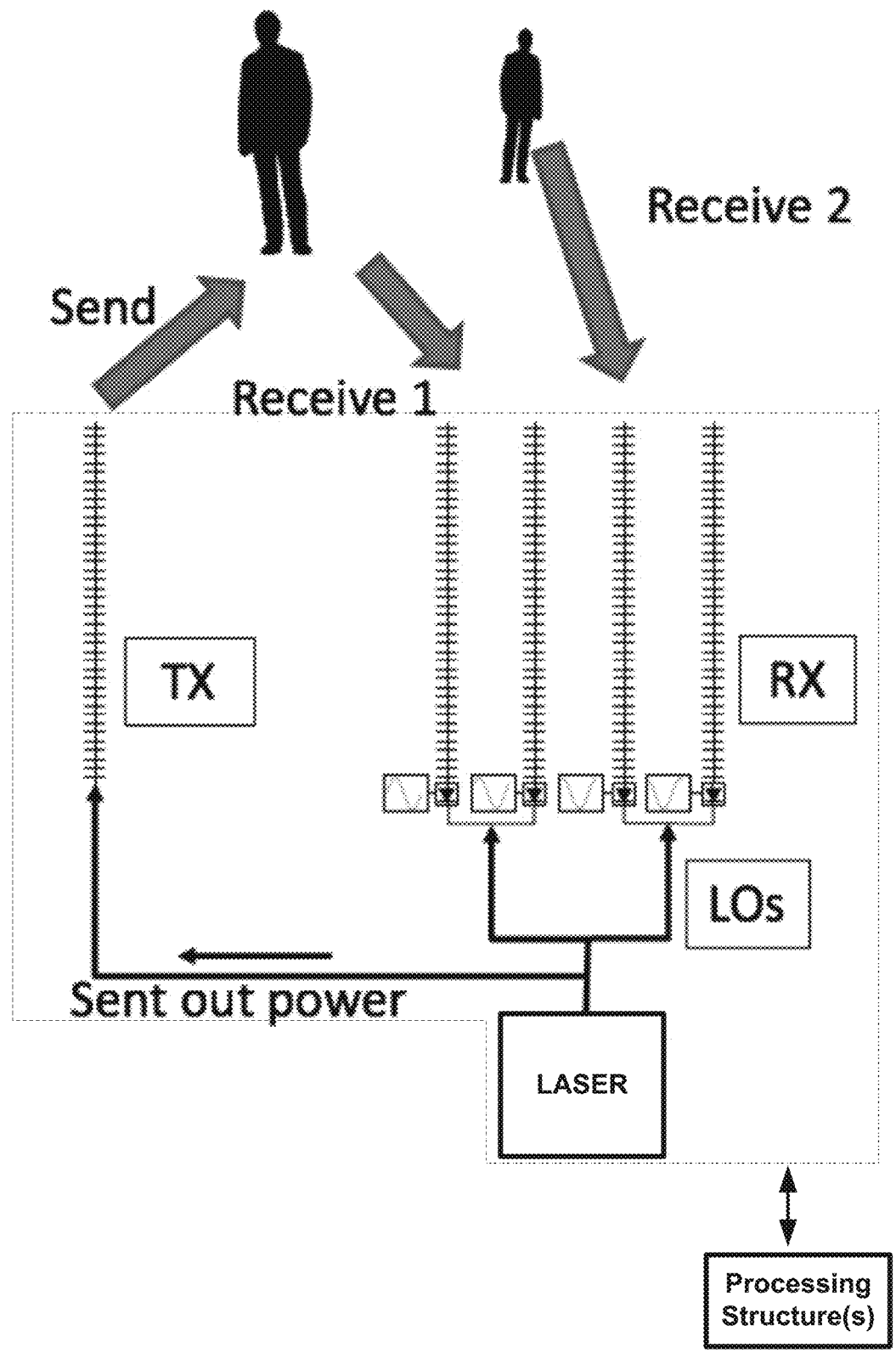
FIG. 2 is a schematic diagram of an illustrative LiDAR configuration in which an emitter propagates light in all horizontal directions while the vertical directions of emitted light is controlled by its wavelength wherein light backscattered (reflected) by several targets is collected by multiple receiving antenna (gratings) according to aspects of the present disclosure.

Turning now to FIG. 2, there is shown a schematic diagram of an illustrative LiDAR configuration in which an emitter structure TX emits optical energy (light) in all horizontal directions while the vertical directions of emitted light is controlled by its wavelength. The emitted light that is backscattered by one or more targets (objects) is subsequently collected by multiple collecting structures (RX) according to aspects of the present disclosure.

We note that in one illustrative embodiment, the multiple collecting structures may include waveguide grating antennae to collect backscattered light. The light so collected is directed to a photonic circuit—that may be as simple as a straight optical waveguide—and subsequently into multiple coherent receiver structures.

As illustratively shown in the figure, each of the collecting structures is associated with an individual coherent receiver structure that may include one or more photodetectors suitable for the detection of the backscattered radiation. Each respective coherent receiver structure is configured to receive the backscattered optical radiation collected by its respective collector structure, "beaten" with a portion of a local oscillator output signal (LO) and produce signals indicative of the phase and amplitude of the received optical radiation.

At this point we note that in a preferred, illustrative embodiment, the single emitter structure is substantially identical to each individual one of the plurality of receiver structures although it need not be. Of particular interest to those skilled in the art, such emitter may include an optical phased array.

Note further that as shown in this figure, since multiple objects are shown as illuminated by the emitted optical energy within the transmitted far field line, one needs to distinguish each object by their angle relative to the collector structure as well as their distance(s) from the collectors.

As we shall show and describe, systems, methods, and structures according to aspects of the present disclosure advantageously provides for detecting and distinguishing objects and their relative direction(s) and distance(s) by any one of a number of techniques including digital beam steering, optical Fourier transform, and lens(es) or other optical elements preceding collector structures in the optical path of the backscattered light. Regardless of the method of converting light from the pupil plane to the image plane (to measure object properties as a function of angle), there are several techniques that can be used to measure properties of the object(s). Object properties of interest may include the range to the object(s), the velocity of the object(s), the vibration profile of the object(s), or the complete amplitude and phase of the light field projected by the object(s).

One method, known as frequency modulated continuous wave (FMCW) detection with source modulation involves directly modulating a laser source frequency with either cavity length change, filter frequency adjustment, current injection or any other method that slightly changes the central frequency of the laser as a function of time. The laser frequency is ramped up/down and the amount of the delay in the backscattered signal return and the Doppler shift due to the movement of the target determine the frequency of the detected RF signal. Therefore, by measuring the frequency in each time section both the distance and the speed of the object are determined Alternatively, instead of relying on the frequency or phase of the light sent out, the source amplitude can be modulated with a chirp function. Note that cross-correlation of the returned backscattered signals and the local oscillator are used to determine the total travel time of the signal to the object and back. Moreover, to eliminate the effect of small movements of the object and any slight changes in the optical path due to turbulence, I/Q detectors can be used to eliminate the effect of the optical phase of the return signal and extract only the amplitude of the returned light.

Digital Beam Steering

One method of determining the angle of any received light utilizes a respective coherent receiver structure for each collector structure and sampling the phase of any electrical beat frequencies that provide information about an interrogated/illuminated object (target).

Figure 3:
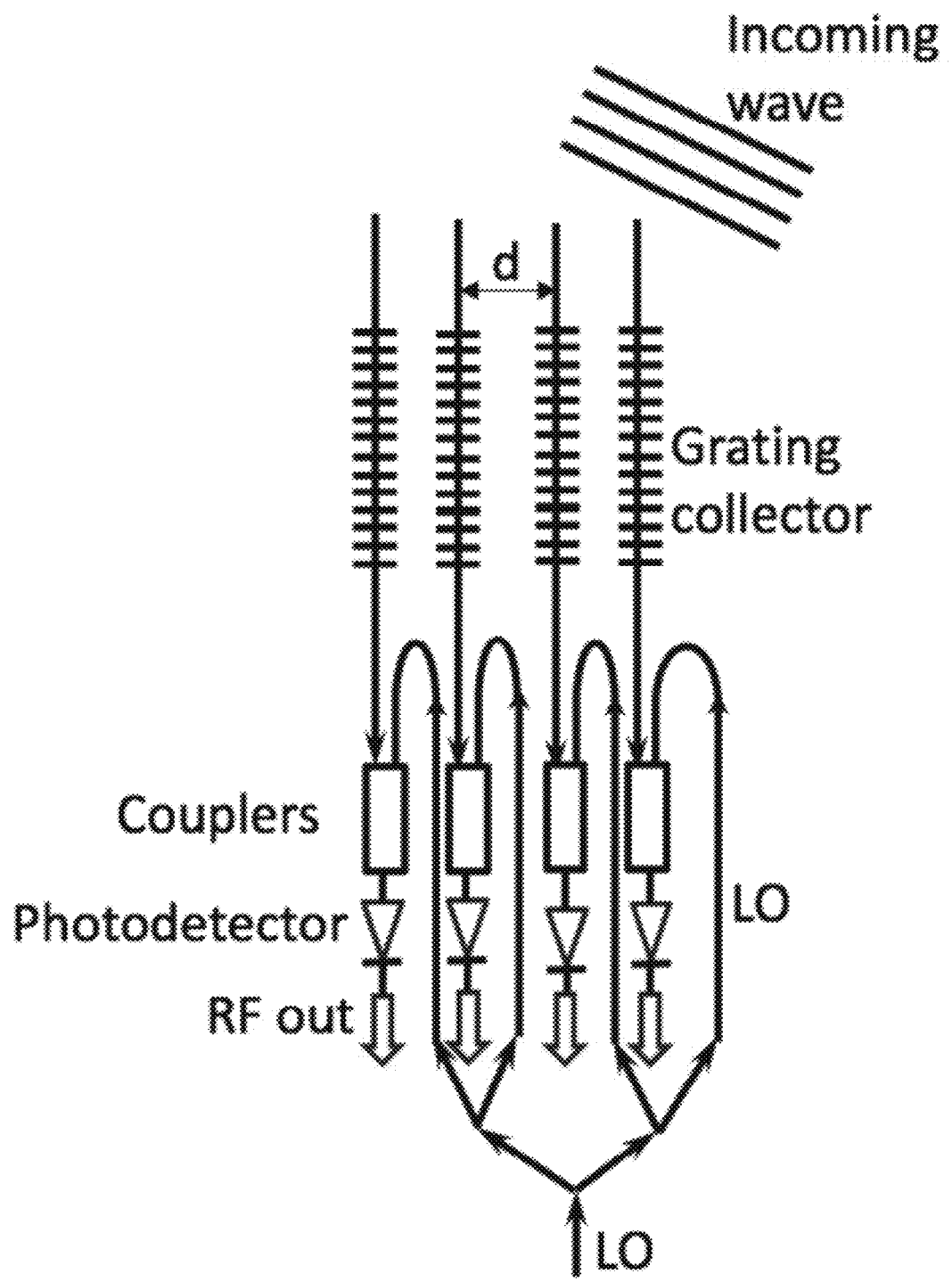
FIG. 3 is a schematic diagram illustrating the angle of an incoming light wave results in phase differences between neighboring photodetectors corresponding to the difference in time of arrival of the wave to each receiving antenna (collecting grating) according to aspects of the present disclosure.

With reference to FIG. 3, there is shown a schematic diagram showing illustrative collector structures and respective receiver structures wherein the angle of the incoming wave (i.e., backscattered light) leads to phase differences between neighboring receiver photodetectors that correspond to the difference in the time of arrival of the wave to each collecting grating.

We note that this phase detection can be achieved in any pseudo-heterodyne configuration that produces an electrical beat frequency such as frequency-modulated continuous-wave (FMCW) LIDAR. Consider this case where due to the time delay between the received signal and the LO, there is an electrical beat frequency at the detector that is related to the time-of-flight distance between the system and the target. Due to multiple targets being illuminated, multiple beat frequencies arise at each photodetector as shown below:

$$E_{beat}(t) \propto \sum_i \sqrt{P_{RX_i} P_{LO}} \cos((\omega_{RX_i} - \omega_{LO})t + \theta_{RX_i} + \theta_{LO})$$

where t is time, $P_{RX}$ and $P_{LO}$ are the optical powers of the received signal and the local oscillator, $\omega_{RX}$ and $\omega_{LO}$ are instantaneous received signal and local oscillator optical frequencies, and $\theta_{RX}$ and $\theta_{LO}$ are the optical phase of the received signals and local oscillator, respectively.

To determine the angle to the object, the phase difference of the frequency of interest between collector antenna elements can examined. This is because the received signal can be viewed as a collection of plane waves of different angles and frequencies, each plane wave angle for a different object in an interrogation region.

The individual incoming plane waves have slightly different frequencies due to the frequency modulation of the light source and the fact that the total travel time from the emitting aperture to the object and back into the collecting apertures depend on the exact distance each object is located at away from the device.

When comparing two adjacent photodetectors, it is clear that each of them receives all plane waves from all around it and creates a continuum of RF frequencies when the collected light is beaten against the local oscillator. Thus, the difference between adjacent detectors is that at each frequency of the RF spectrum, which normally corresponds to backscattering from one spot in the distance, there is a constant jump in phase going from each detector to its neighboring elements. Therefore, looking at all the photodetectors (or some subset of them), and observing the amount of the phase difference between neighboring elements, one may determine the angle at which a plane wave arrived is given by the formula:

$$\theta_i = \operatorname{asin}\left(\frac{\Delta\phi_i + n2\pi}{2\pi d/\lambda}\right)$$

where $\theta_i$ is the angle to target i, $\lambda$ is the wavelength of light in the medium of propagation, $\Delta\phi_i$, is the phase difference between receiver elements for frequency ($\omega_{RXi}-\omega_{LO}$) for object i, and d is the spacing between the collector elements. In this equation, can have multiple solutions (for multiple values of n) as long as the term inside the brackets stays smaller than unity. Therefore, for arrays with large separation between the receiving elements (d>$\lambda$/2), there is an ambiguity in the angle of the incoming wave as it is down-sampled by a spatially sparse array.

Figure 4A:
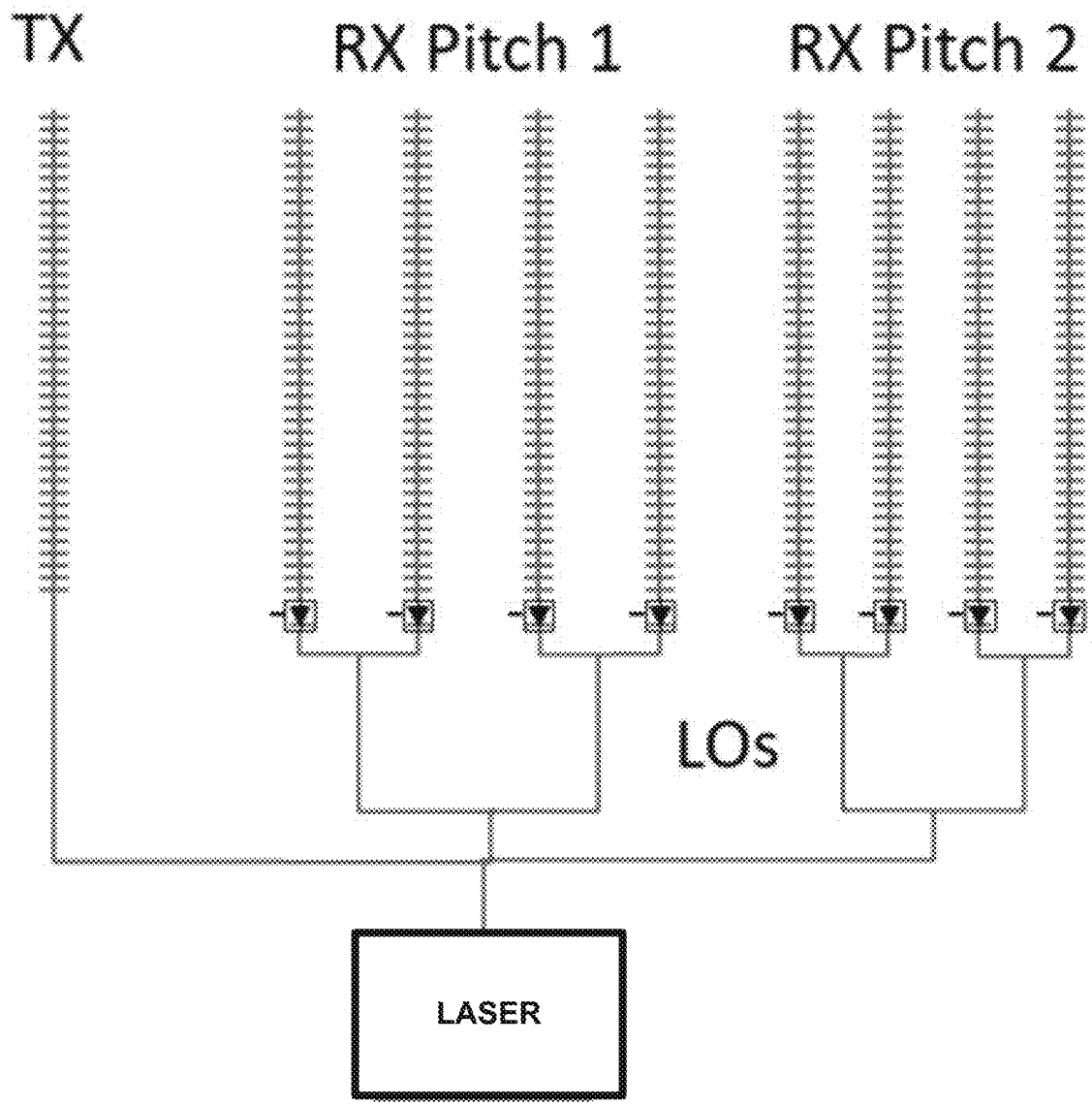
FIG. 4(A) is a schematic diagram of an illustrative configuration including a single transmitter antenna array and two receiver antenna arrays (RX pitch 1, RX pitch 2) exhibiting unequal pitches to remove ambiguity with respect to the angle of the incoming wave according to aspects of the present disclosure.
Figure 4B:
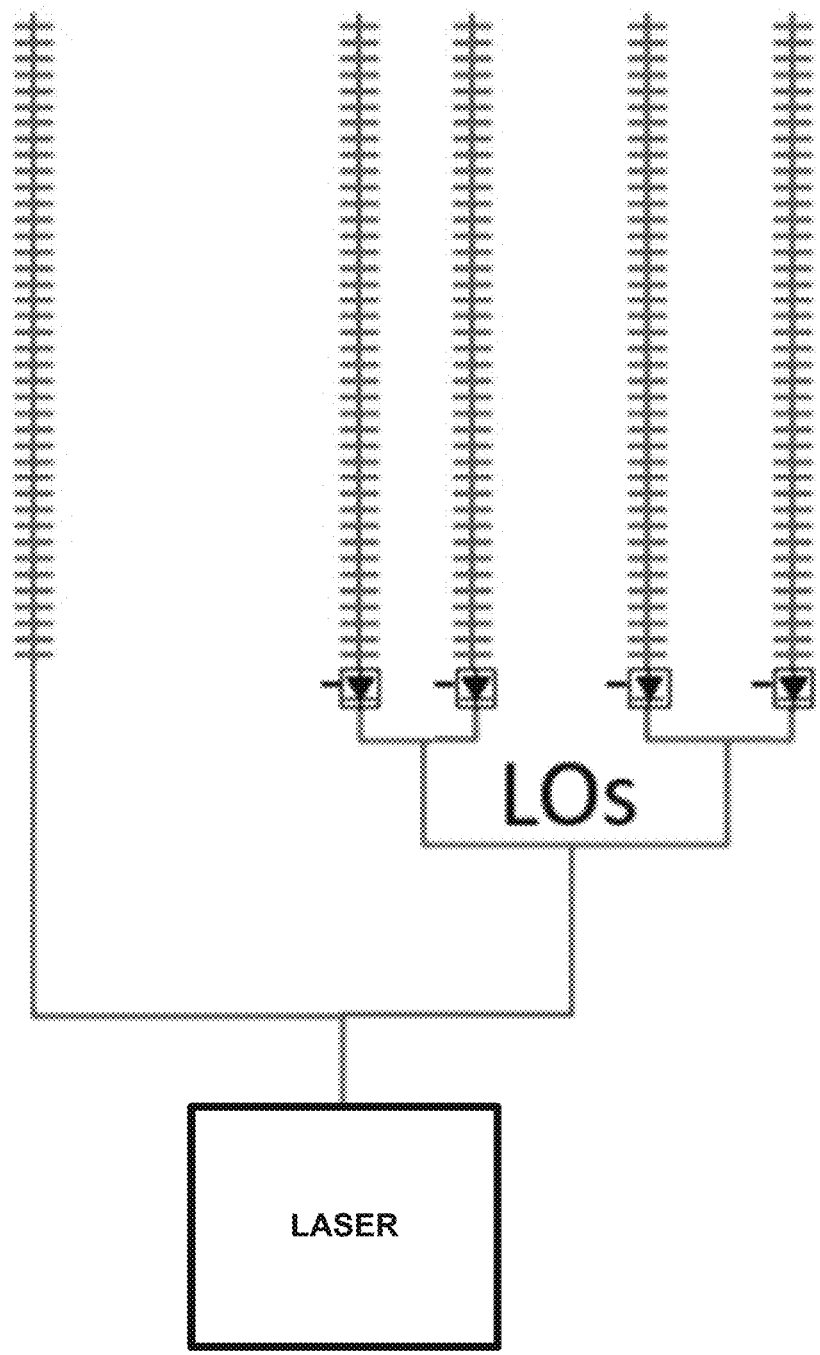
FIG. 4(B) is a schematic diagram of an illustrative configuration including a single transmitter antenna array and a receiver antenna array exhibiting an aperiodic RX pitch wherein angular ambiguity is eliminated by eliminating the periodicity in the receiver array according to aspects of the present disclosure.

Much like an array factor, this formula only has a single solution when the receiver elements (collector structures) are spaced apart by a distance less than $\lambda$/2. One can also think of this as being the Nyquist criteria but in the spatial domain. This can be circumvented in several ways such as aperiodic spacing between structures such as that illustratively shown in FIG. 4(A) or having multiple structures at different pitches as shown illustratively in FIG. 4(B), which have different aliasing characters and can result in an unambiguous sampling.

Optical Fourier Transform

Another method to split the multiple received signals into different "angle bins" is to use an on-chip optical Fourier transform and detect each spatial frequency with a detector in the optical domain. As known in Fourier optics, a lens creates a Fourier transform of the wave distribution on its other side.

Figure 5A:
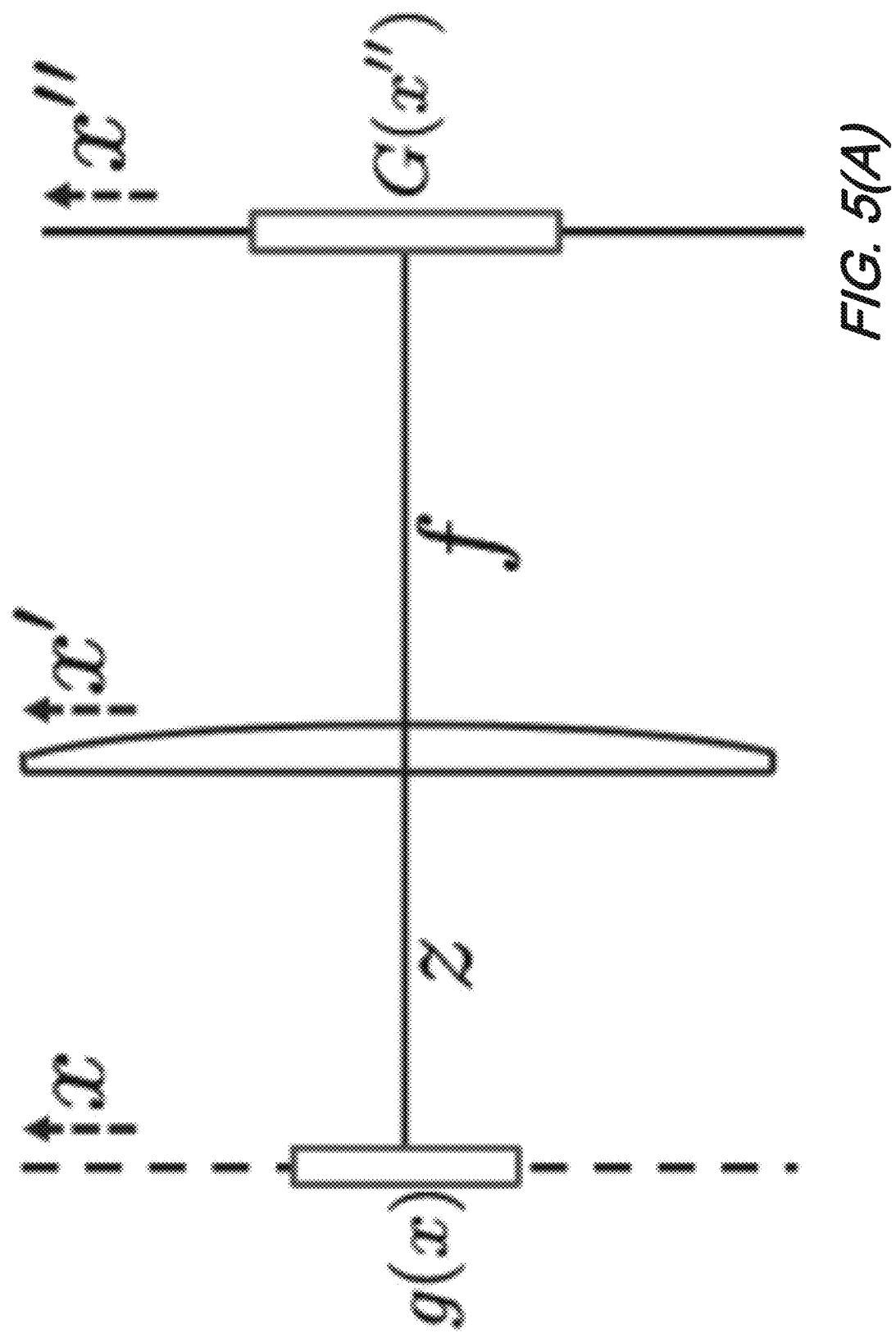

For example, as shown in FIG. 5(A)—which shows an illustrative lens configuration—a complex wave distribution g(x) on the left side of the lens side at distance z (with an arbitrary amplitude and phase distribution across the opening window), travels to the lens and is detected on the right side at the focal distance of the lens (f). The complex function field distribution on the right focal plane (G(x″)), can be calculated from g(x) as follows $$G(x'') = e^{j\pi\left(1-\frac{z}{f}\right)\frac{x''^2}{\lambda f}} \int g(x) e^{j2\pi \frac{x''x}{\lambda f}} dx$$

Especially, when the object plane (left side) is at a focal distance (z=f), the above equation simplifies to a Fourier transform:

$$G(x'') = \int g(x) e^{j2\pi \frac{x''x}{\lambda f}} dx$$

As can be seen from FIG. 5(B), an optical Fourier transform will map an incoming phase distribution of the collecting antenna elements to an array of detectors. For example, a plane wave entering through window on the left with a tilt can be interpreted as a step function having a uniformly varying phase. Such a function leads to a Fourier transform which is shaped like a sinc (sampling) function (due to the windowing effect) in amplitude and is moved up from the center due to the phase function arising from the tilted incoming beam.

Figure 6:
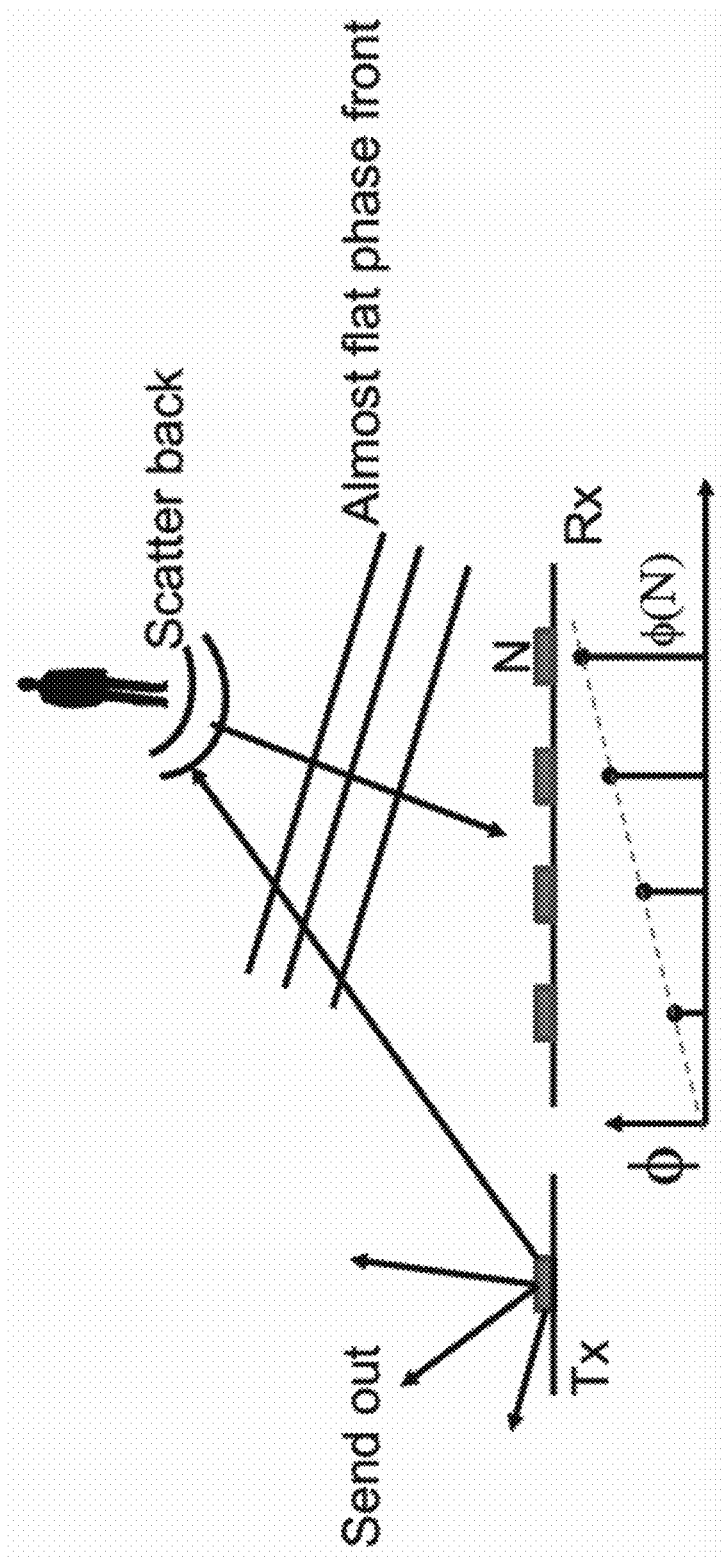
FIG. 6 is a schematic diagram illustrating when an object is at a far-field region, nearly flat phase fronts of the back-scattered light create a linear phase function that is dependent on the angle of the incoming wave according to aspects of the present disclosure.
Figure 7A:
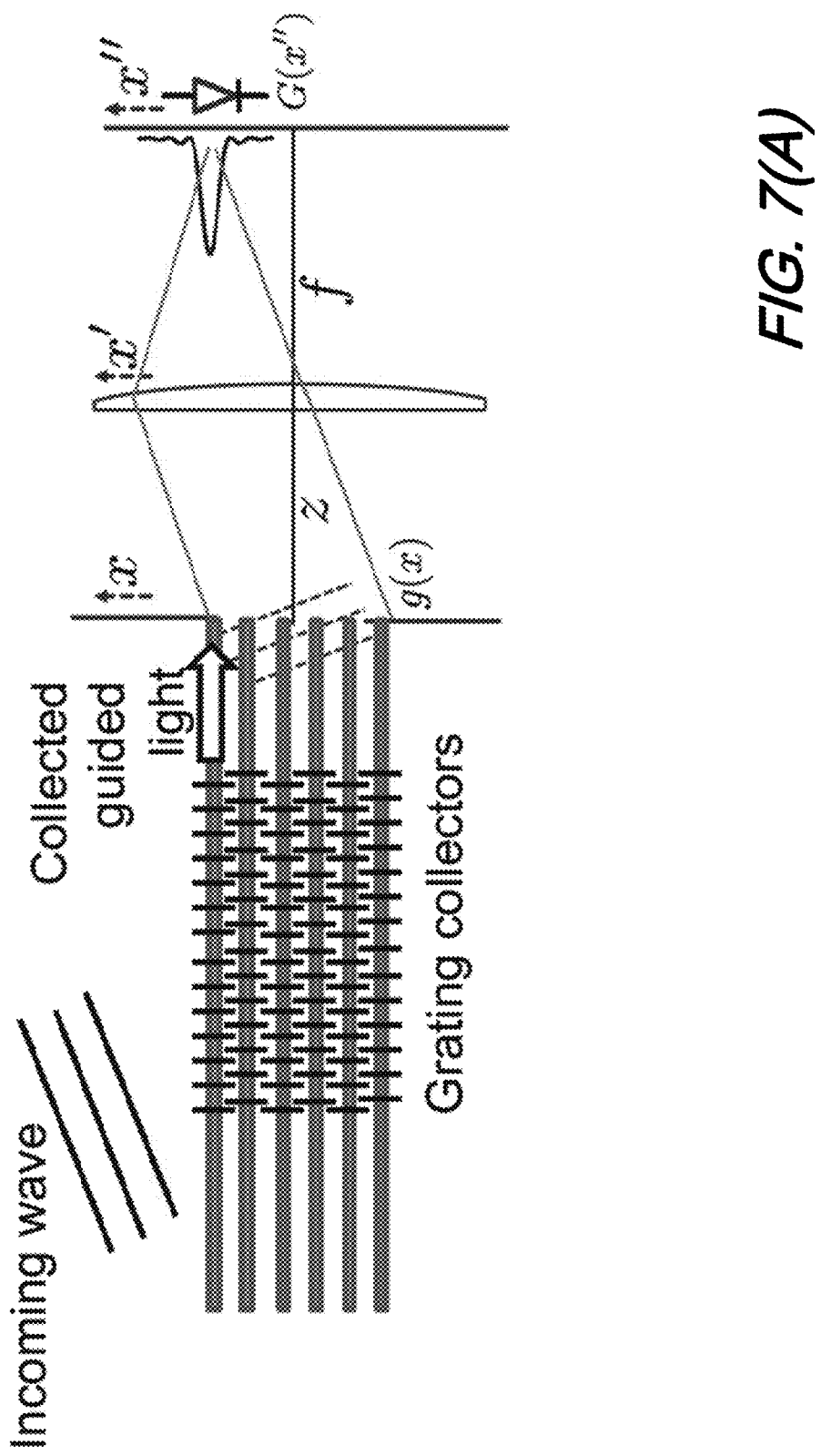
FIG. 7(A) is a schematic diagram illustrating a tilted phase front of an incoming wave leads to a phase function between waveguides and that tilted phase front of the guided waves leads to the light being focused on a particular photodetector shifted from center according to aspects of the present disclosure.

In our devices, a plane wave that is incident to the collector elements creates a linear phase distribution in the collector elements. As may be observed in FIG. 6 if the object is at the far field region, nearly flat phase fronts of back scattered light create a linear phase function which is dependent on the angle of the incoming wave(s). As a result—and according to further aspects of the present disclosure—outputs of collector elements go through an optical Fourier transform structure that will advantageously map the respective receiver input to a single photodetector where ranging can occur as schematically illustrated in FIG. 7(A).

Stated alternatively, the g(x) function for a collection of guided mode inputs becomes a discrete function g(i). The angle of the incoming wave is now translated to the angle of a complex function g(i). If the waveguide collectors are at a distance d from each other, an incoming wave with an angle $\theta$ with respect to the normal leads to a phase function $$g(i) = \exp\left(j\frac{2\pi}{\lambda_o} d \cos(\theta) i\right).$$

The Fourier transform property of the lens leads to G(x″) having a peak at x″=fd cos ($\theta$).

Figure 7B:
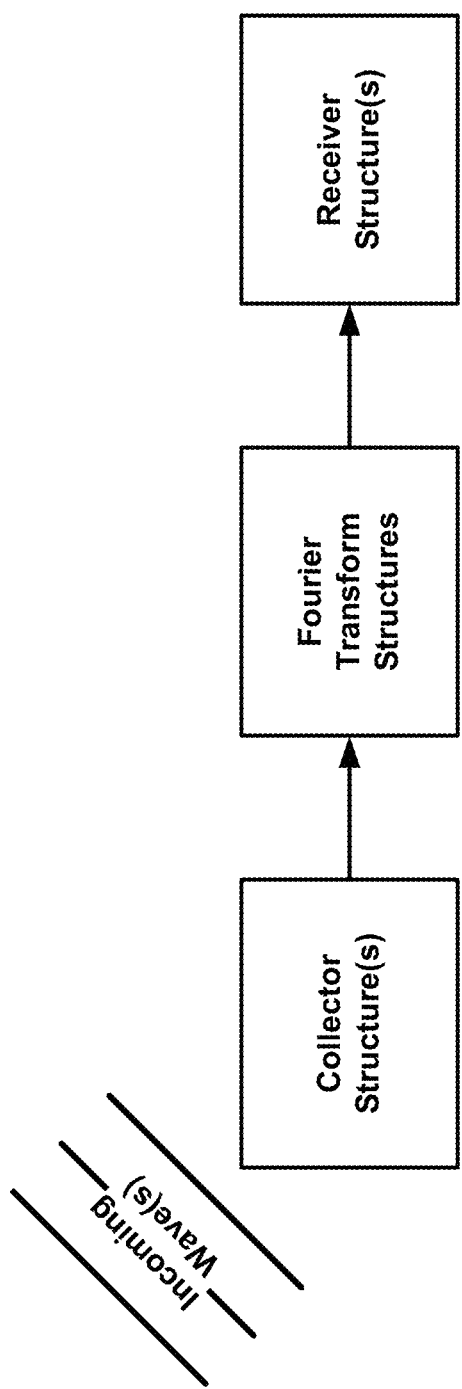
FIG. 7(B) is a schematic block diagram illustrating an overview of the Fourier transform operation and structures according to aspects of the present disclosure.

FIG. 7(B) is a schematic block diagram illustrating an overview of the Fourier transform operation and structures according to aspects of the present disclosure. More particularly, incoming waves of optical energy—backscattered from object(s) in an interrogation area, are collected by collector structures and the collected optical energy undergoes an optical Fourier transform and the transformed optical energy is then directed to receiver structure(s).

To realize an on-chip, all planar configuration for such a system, we first apply a focusing phase front to the optical energy (light) and then propagate it for a length at least equal to the focusing distance of that phase front. More specifically, an optical Fourier transform can be achieved by creating an on-chip lens by propagating the light from the grating waveguides in a slab waveguide medium and implementing the phase function of a lens unto the in-plane propagating light with perturbations to the local effective index of the slab with a photonic crystal or an added material effecting the evanescent tail of the slab guided mode.

Figure 8:
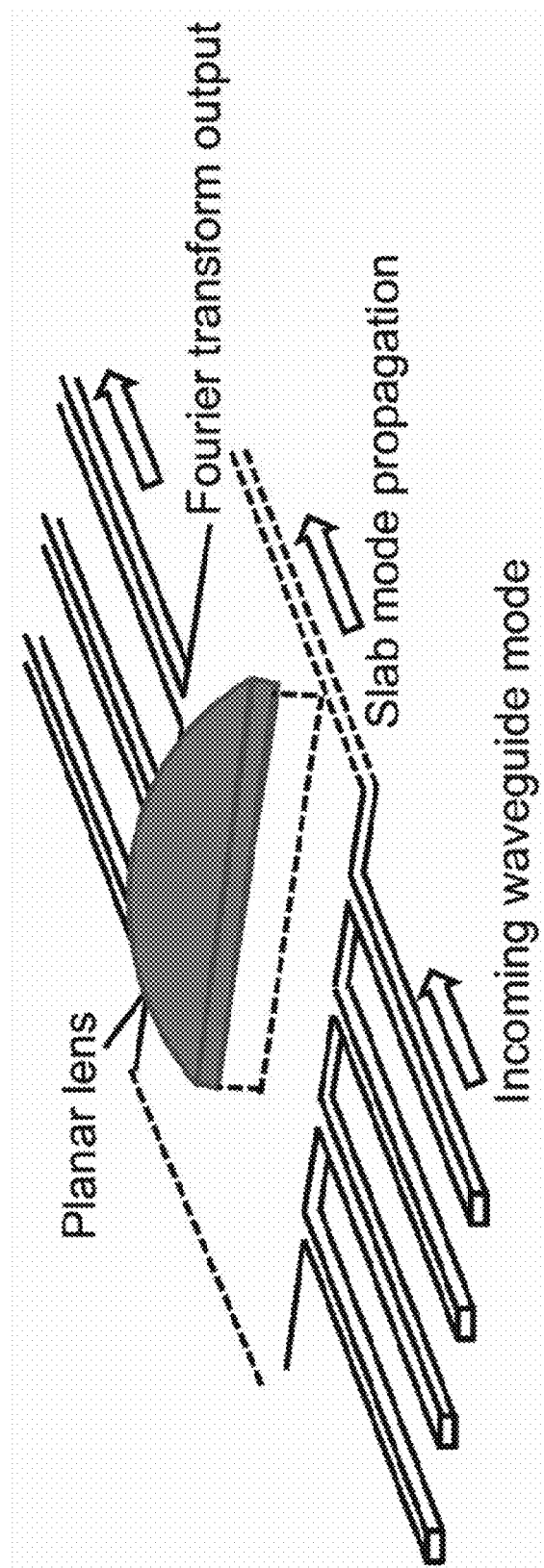
FIG. 8 is a schematic diagram of an illustrative configuration wherein a planar lens is added to a top of a slab propagation region to perform Fourier transform operation(s) according to aspects of the present disclosure.

FIG. 8 is a schematic diagram showing an illustrative slab waveguide structure including a planar lens to perform the Fourier transform operation. As shown in that figure, a slab waveguide region is interposed between and in optical communication with a plurality of input waveguides and a plurality of output waveguides. A planar lens is shown formed upon a top surface of a portion of the slab waveguide.

At this point those skilled in the art will readily appreciate that light traversing the incoming waveguides (incoming waveguide mode) are directed into the slab waveguide (slab mode propagation) where it undergoes the effect of the planar lens. Consequently, and according to aspects of the present disclosure, such affected light will exhibit a converging and/or focusing phase front (i.e., hyperbolic-shaped) and be directed in the slab to the output waveguides where it subsequently exits the overall structure. As will be appreciated by those skilled in the art, a length of the slab waveguide through which the focusing wavefront propagates will be at least as long as focus point of the wavefront.

To find the optimal shape of the planar lens, the effective index of the planar slab mode in the regions that a second film (planar lens) is present ($n_2$) and the other regions ($n_1$) should be considered.

Figure 9:
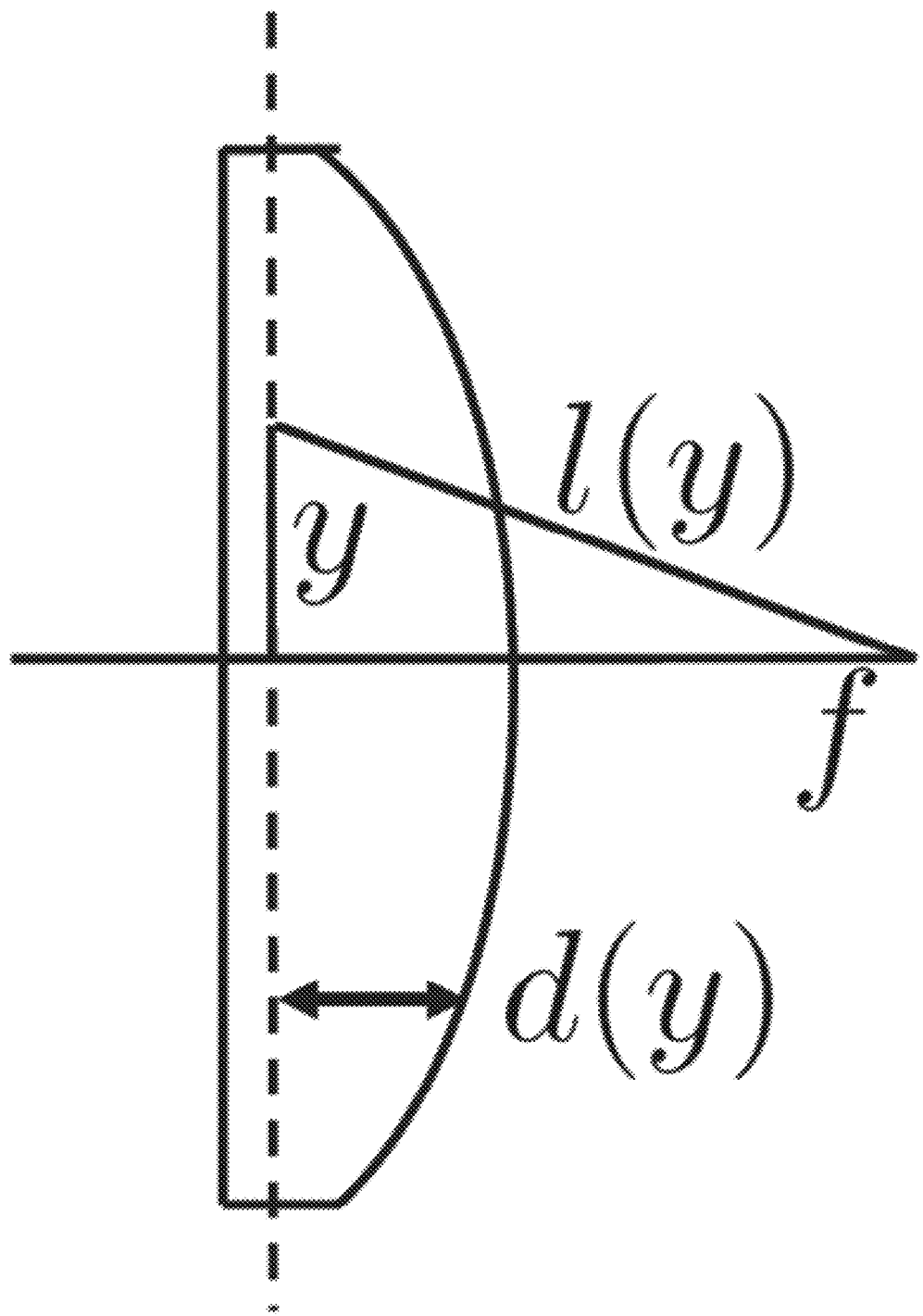
FIG. 9 is a schematic diagram of an illustrative lens showing that path length of the light passing through the center of the lens and the off-center path to the focal point should be equal according to aspects of the present disclosure.

Turning now to FIG. 9—which is a schematic diagram illustrating a lens structure showing a path length of light passing through the center of the lens and the off-center path to the focal point should be equal. Accordingly, if a plane wave incident is normally incident from the left side in FIG. 9, for the effective light path to be equal to the focal spot:

$$n_1 \times l(y) + (n_2 - n_1) \times d(y) = n_1 \times f + (n_2 - n_1) \times d_o$$

$$\Delta n(d_o - d(y)) = n1 \times \left(\sqrt{y^2 + f^2} - f\right)$$

and $$d(y) = d_o - \frac{n_1}{\Delta n}\left(\sqrt{y^2 + f^2} - f\right)$$

which shows that the higher the index contrast between the two slab regions is, the flatter the lens surface will be.

Figure 10A:
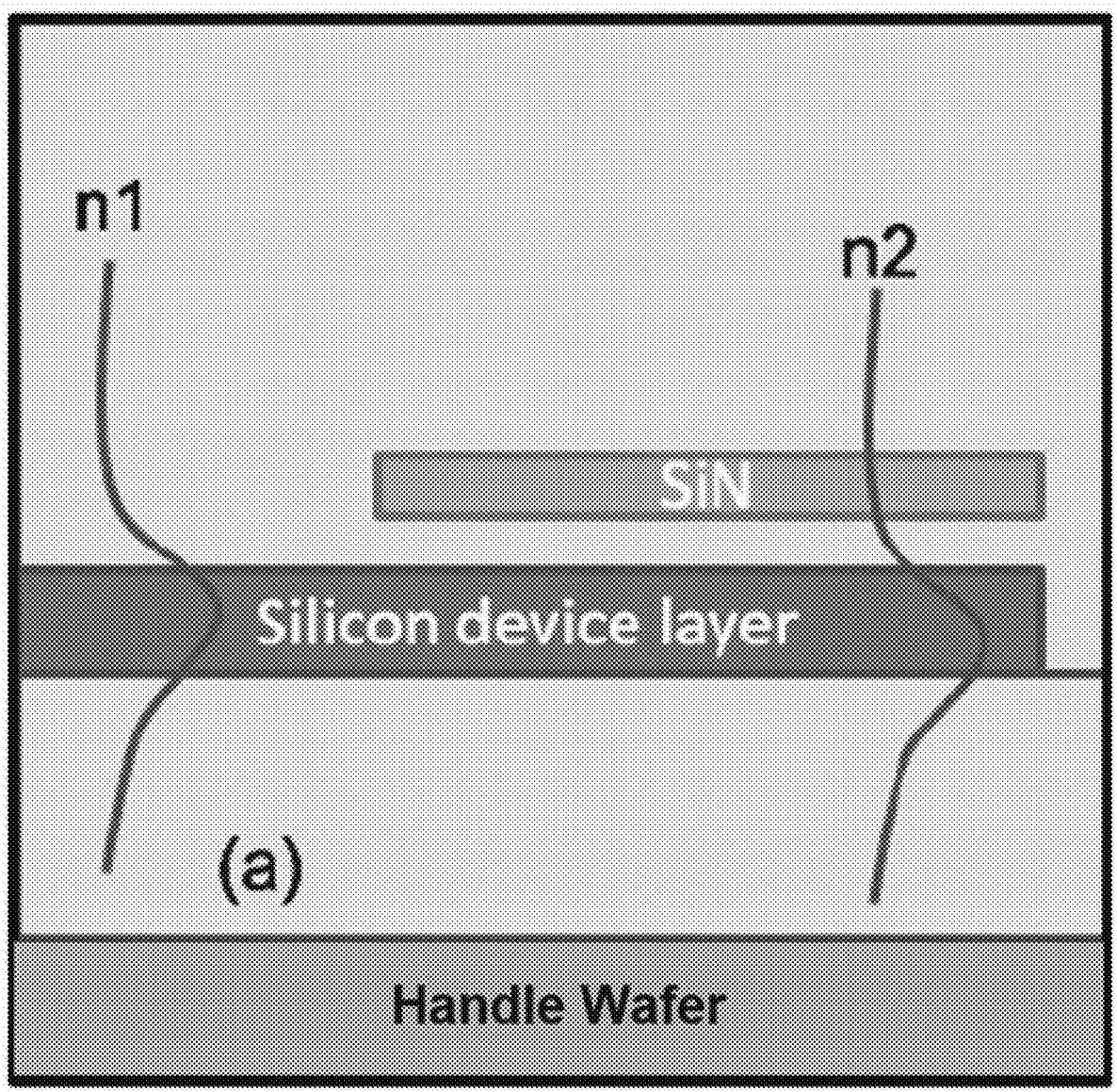
FIG. 10(A) is a schematic diagram illustrating that a SiN layer provides a weak perturbation to the slab mode propagating in Si.
Figure 10B:
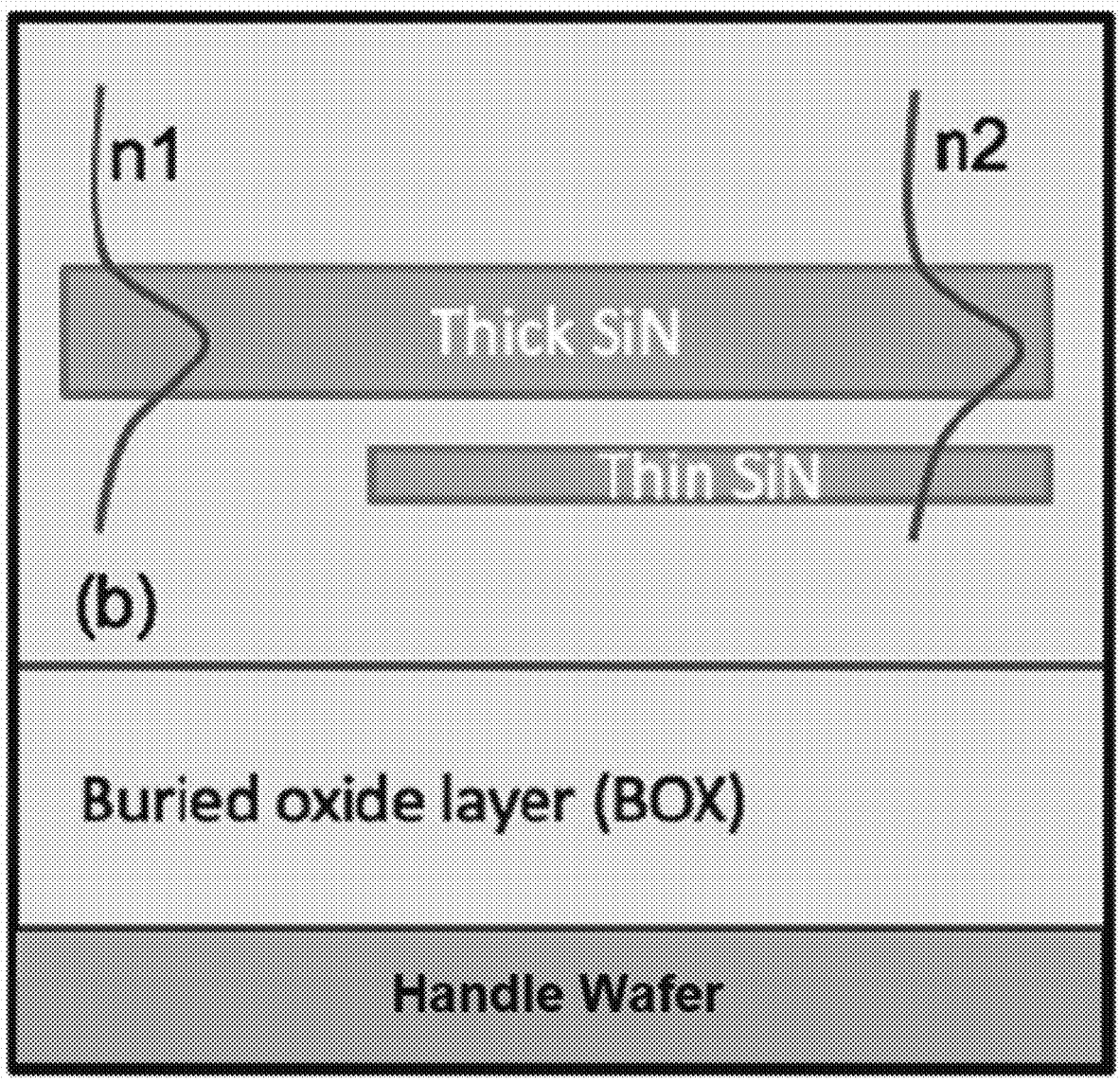
FIG. 10(B) is a schematic diagram illustrating that with two nitride layers the thinner nitride acts as a perturbation to the mode more confined in the thicker nitride layer according to aspects of the present disclosure.

Note that the index contrast between the two regions depends on the confinement of the light in the slab region and the type of perturbation used for index modification. For example, if the light is propagating in a high index slab mode (for example 220 nm silicon device layer) and a layer of silicon nitride is added as a perturbing top layer (FIG. 10(A)), the index contrast is much smaller than the scenario in which the index of the guiding layer and the perturbing layer are close to each other (FIG. 10(B)). If the index contrast is too small, the width of the planar lens in the middle section of it ($d_o$) become excessively large.

To make the lens easier to fabricate (at the expense of wavelength range, the function d(y) can be flattened by subtracting multiples $\lambda/\Delta n$ from the lens width. Such a configuration is shown illustratively in FIG. 11 which shows a planar Fresnel lens created by subtracting multiples of $\lambda/\Delta n$ from d(y). Apparently this $\lambda/\Delta n$ subtraction will be accurate only for one wavelength unless $\Delta n$ also changes at the same rate as wavelength. Fortunately, for structures based on evanescent perturbation, increasing the wavelength increases the mode cross sectional size and increases the effect of the perturbing objects on the effective index.

Another method of performing an optical Fourier transform on chip instead of the above-described planar lens perturbation technique involves direct phase perturbation on the waveguides. In this method, a converging and/or focusing phase function necessary for focusing the wave front is superimposed on the optical waveguides carrying the collected light after the collectors.

More particularly, a set of tunable phase shifters (electrooptic or thermal) or static delay lines can be created such that a central waveguide experiences the greatest amount of phase shift and the delay is reduced following an analytic function for all other waveguides.

Figure 12:
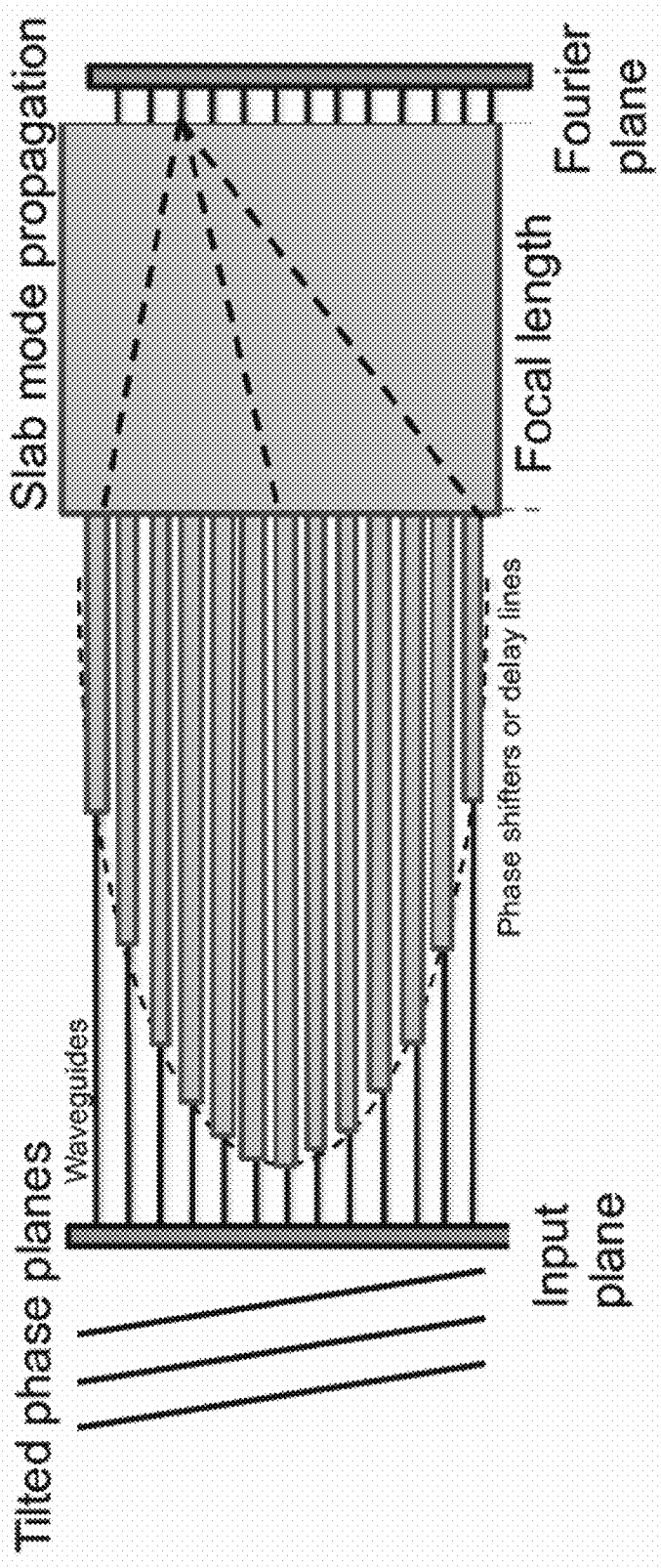
FIG. 12 is a schematic diagram of an illustrative waveguide array configuration showing the creation of a Fourier transform array by imposing a focusing phase function on the waveguide array according to aspects of the present disclosure.

FIG. 12 is an illustrative configuration of a set of waveguides providing input to a slab waveguide. Each of the individual waveguides in the set includes a phase shifter or delay element that advantageously provides a shift/delay to light traversing the waveguide. When configured appropriately, incoming light exhibiting tilted phase planes will develop a focused phase front through the effect of the phase shifters or delay lines such that when the focused phase front is subsequently directed into a slab waveguide region, it will be focused at a particular spot on the Fourier plane.

In an ideal hyperbolic case, if the separation of the waveguides is d and the effective index of the slab propagation mode is n it follows that the phase function imposed on waveguide i should be:

$$\phi(i) = \phi_0 - n(\sqrt{(di)^2 + f^2} - f)$$

Figure 11:
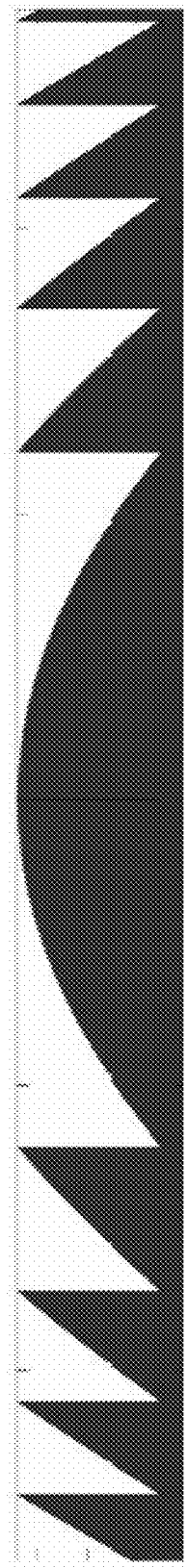
FIG. 11 is a schematic cross-sectional diagram of an illustrative planar Fresnel lens created by subtracting multiples of $\lambda/\Delta n$ from $d(y)$ according to aspects of the present disclosure.
Figure 13:
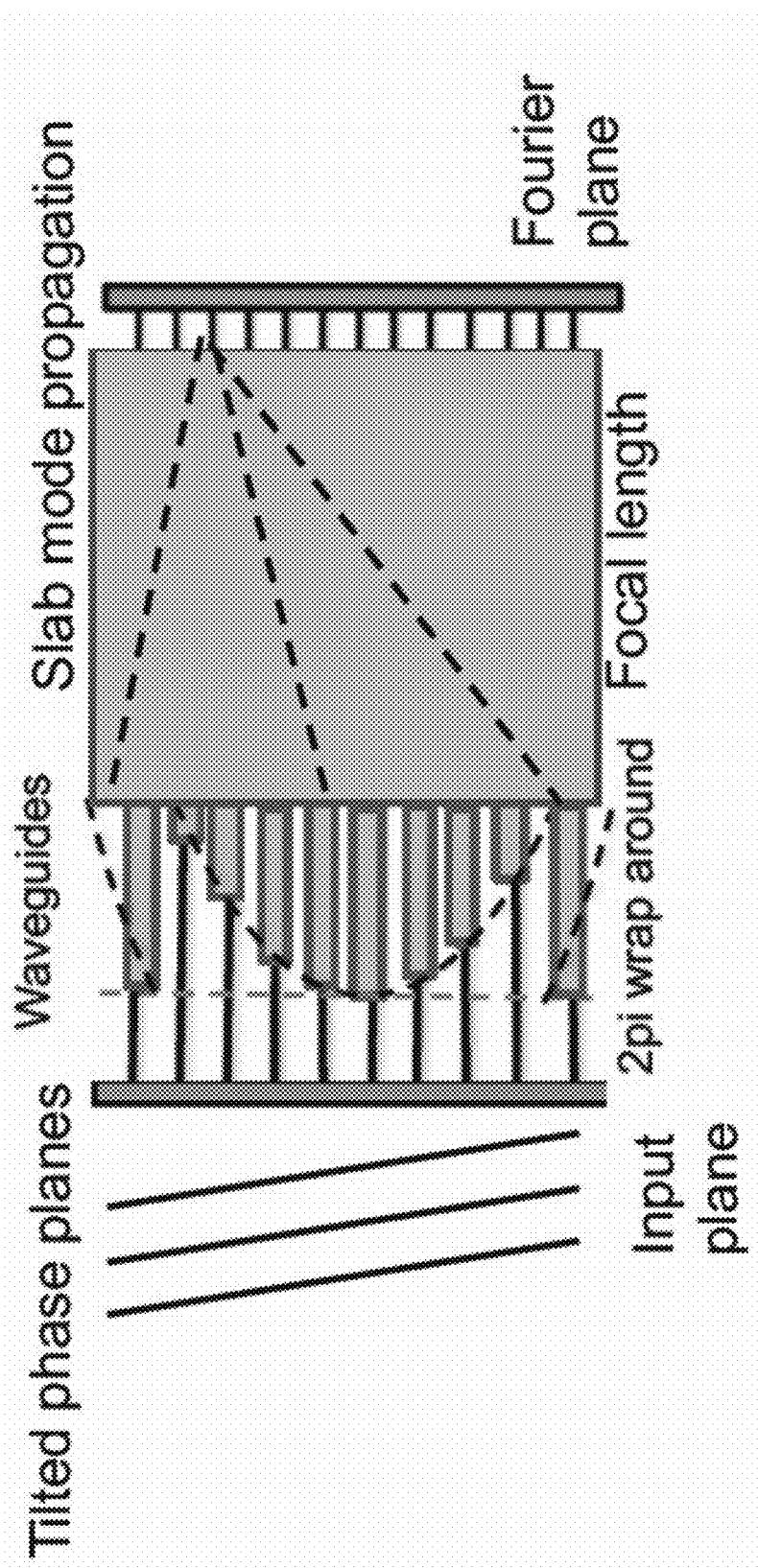
FIG. 13 is a schematic diagram of an illustrative waveguide array with $2\pi$ wrap around showing that by subtracting multiples of $2\pi$ from the phase shifts of the focusing phase functions can be flattened to a shorter structure according to aspects of the present disclosure.

Similar to the evanescent perturbation case illustrated in FIG. 11 in which multiples of $2\pi$ was subtracted from the phase shifts to make a more "flat" lens, the focusing phase function of the waveguides can be reduced to a flattened function in which the phase is changed between zero and $2\pi$ only as shown illustratively in FIG. 13. As may be readily observed by those skilled in the art by inspection of this figure, the structure shown therein is much shorter than that shown in FIG. 12 at the expense of reduced spectral range. Again, it is possible to compensate for wavelength change in such that the $\lambda/\Delta n$ (with $\Delta n$ being the index contrast between the high index waveguide sections and the low index sections) stays relatively constant in a wide spectral range.

It is noteworthy that due to the Petzval field curvature—similar to images shaping perfectly in the human eye—the focal array of photodetectors should be placed in a circular pattern rather than a plane. The radius of the Petzval circle is approximated as $$\left(\frac{n2}{n1}\right)f.$$

Figure 14:
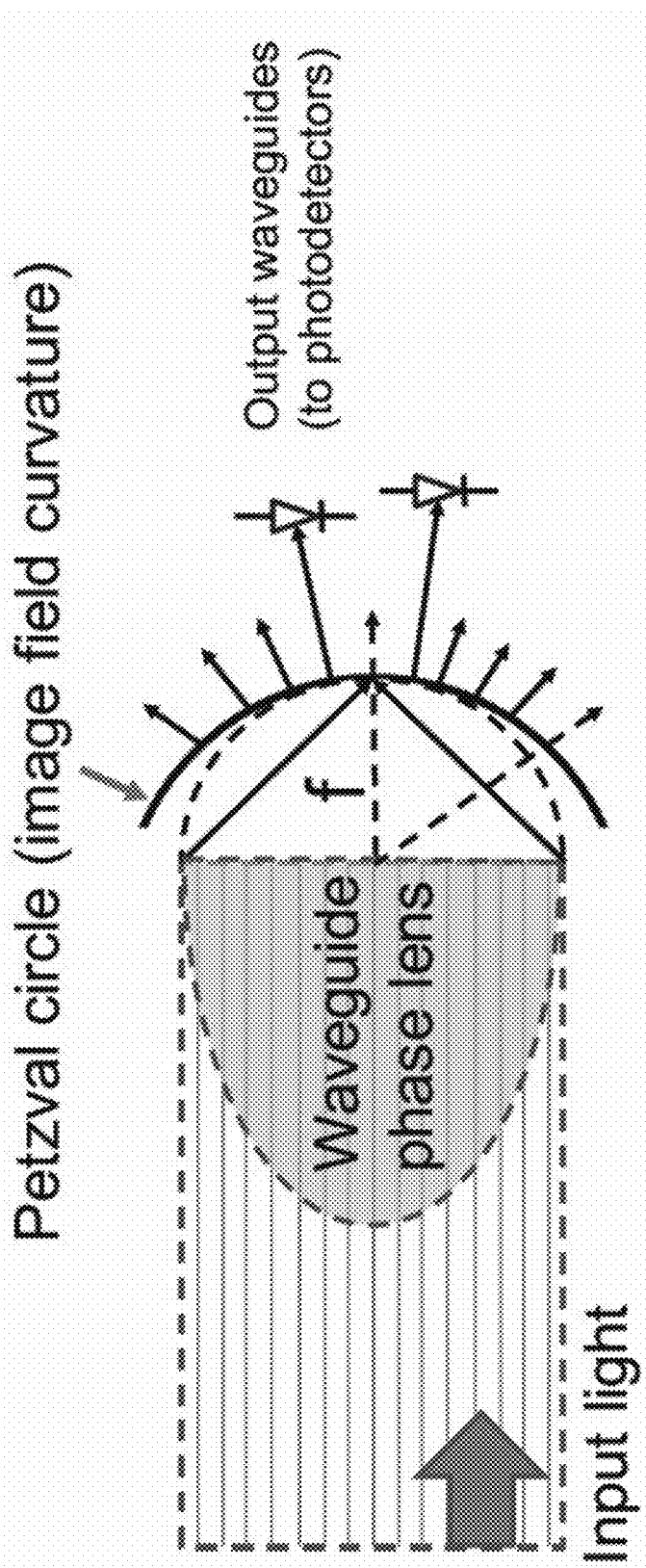
FIG. 14 is a schematic diagram of an illustrative waveguide array lens showing image field curvature and positioning of collecting waveguides on the Fourier plane according to aspects of the present disclosure.
Figure 15:
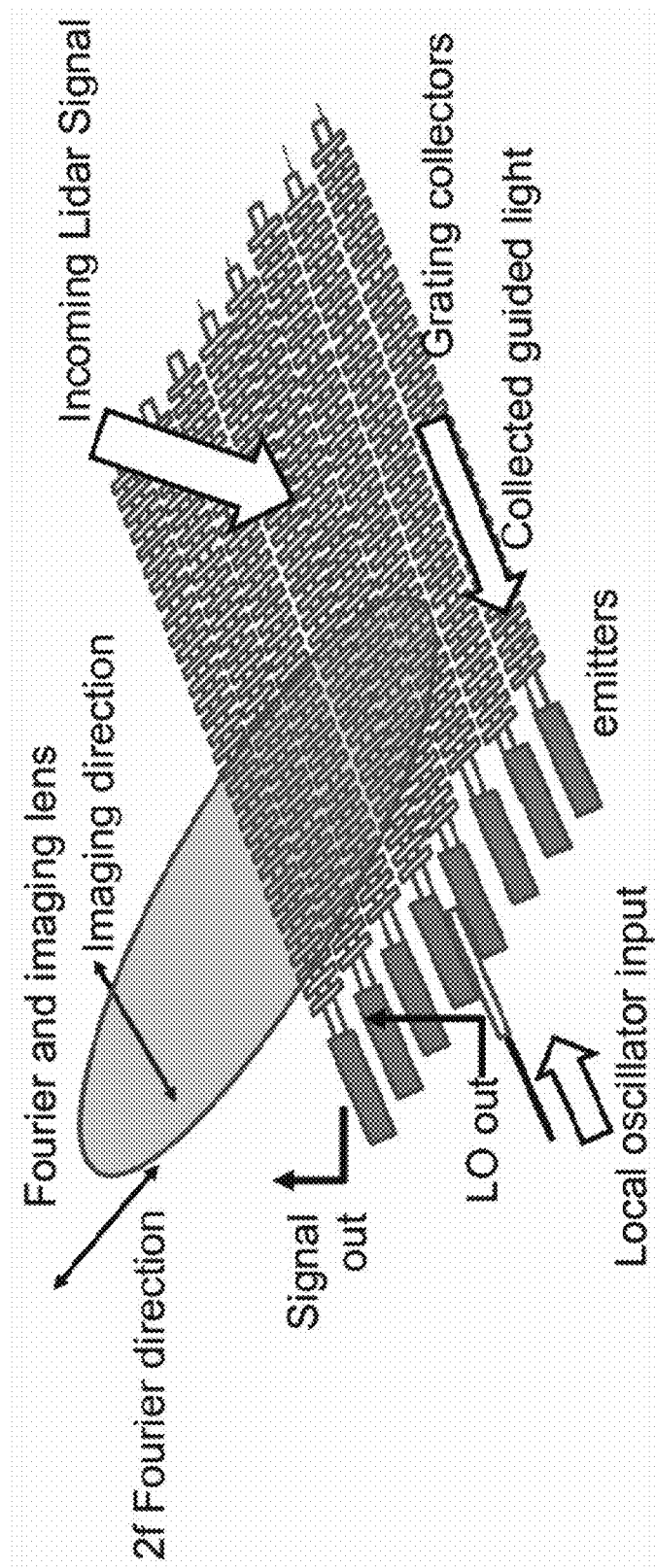
FIG. 15 is a schematic diagram of an illustrative array of emitters and grating collectors using an off-chip lens for Fourier transform operation(s) according to aspects of the present disclosure.

As shown in FIG. 14, the position of the collecting waveguides (which are connected to the photodetectors) is on the Petzval circle which is larger in radius than the focal length. Nevertheless, the waveguides at each collection point could face toward the center of the circle with the radius f. Therefore, the farther away from the center of the Fourier circle, the collecting waveguides do not need to be exactly perpendicular to the slab propagation region. Snell's law should be calculated for optimal alignment of the output waveguide Alternatively, instead of creating a planar, on-chip lens and detector array, one can use a conventional glass lens for the Fourier transform operation. As can be seen in FIG. 15, collecting gratings can be directing collected light toward emitter devices. From the other side of the emitter device, a single, narrow, local oscillator line is delivered. The lens is placed at focal distance above chip and a linear array of photodetectors is placed at the other focal plane of the lens. Both the LiDAR signal and the local oscillator are transformed to their Fourier counterpart on the detector plane. The local oscillator, being like a delta function in the transverse direction is transformed to a uniform line on the detector plane.

Figure 16:
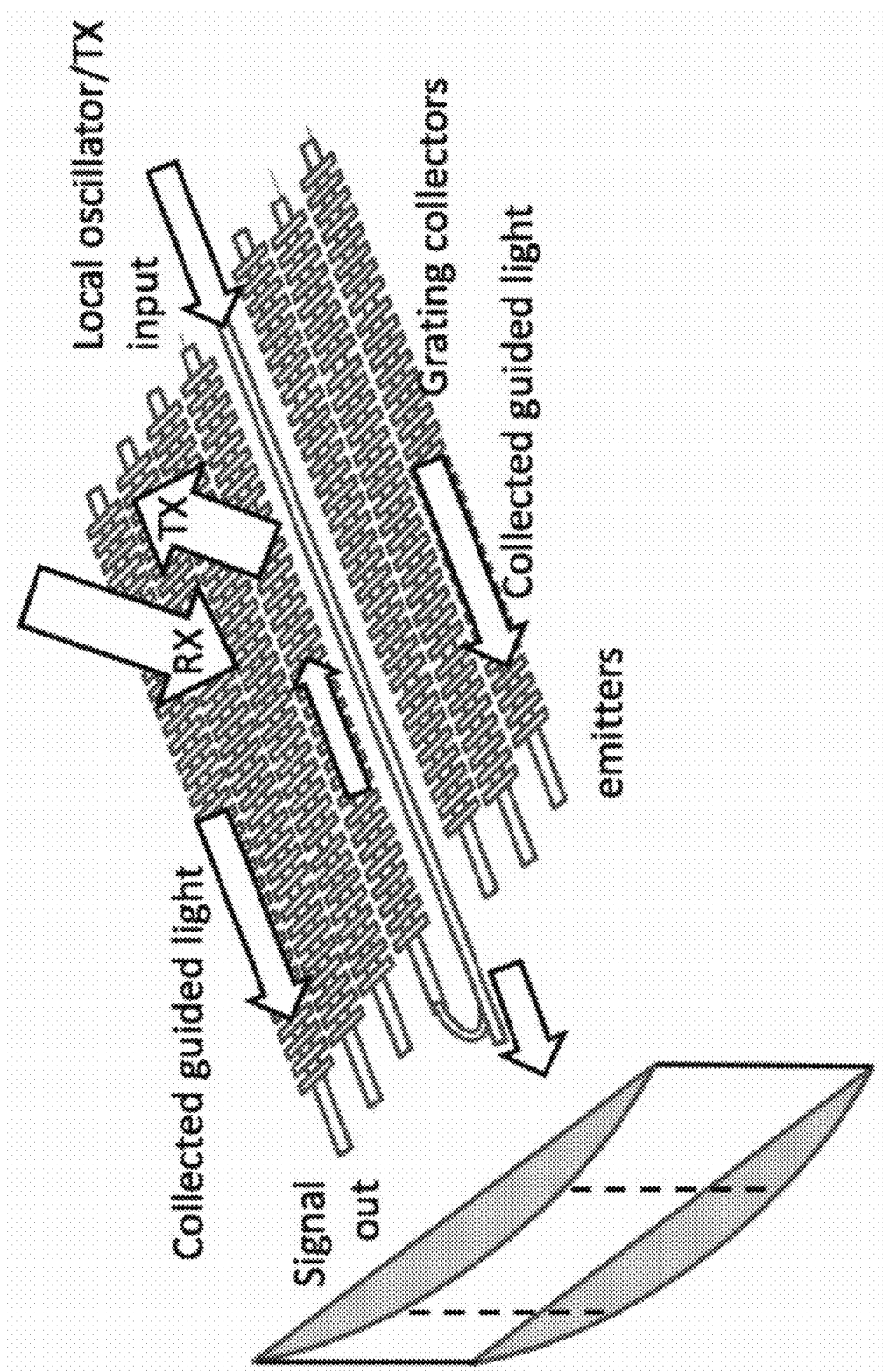
FIG. 16 is a schematic diagram illustrating a Fourier transform lens used to image a chip edge to a detector array according to aspects of the present disclosure.

The signal, on the other hand, is collected at the individual detectors based on the direction of the incoming LiDAR signal which determines the phase distribution of the signal on the collection gratings. The signal from each LiDAR direction will interfere with its portion of the local oscillator on the corresponding focal plane photodetector and creates a beat signal corresponding to the round-trip time the light has travelled from the source and back to the detector array Another similar alternative to this scheme is a case that instead of emitters emitting the light upwards as shown illustratively in FIG. 16, the chip can emit from the edge and a Fourier transform lens is place at the end of the chip. In this case—because the end of the chip is terminated in waveguide edges—the local oscillator should be delivered from the right side of the chip. As can be seen in FIG. 16, the laser signal is coming from the right, divided to two waveguides. A small portion of the laser input goes to the chip edge, and a larger portion is bent back and fed into an emitting grating. The pitch of the emitting grating is exactly the same as the collecting gratings so that for each wavelength the collecting gratings look at the same direction as the mission is directed to. The local oscillator being at the focal point of the cylindrical lens leads to a uniform distribution of the LO power onto the detectors placed at the Fourier plane. The linear pattern of the collection grating waveguides is translated to its Fourier transform and each detector is responsible for one incoming plane wave direction into the grating array.

Focal Plane Array Approach

Instead of using a lens at the output of the collecting gratings, the lens can be utilized before the gratings. In this approach, the gratings are placed at the focal plane of a lens—which could be cylindrical, anamorphic, Fresnel, diffractive, or conventional. The incoming planes waves (scattered from an object at a certain angle and distance from the chip) will be focused by the cylindrical lens. The grating collectors located at the focal plane of the lens each receive only a small range of angles in the lateral direction. The cylindrical lens, being uniform in the longitudinal direction, does not affect the longitudinal direction of the incident waves, which is controlled by the wavelength both on the send and receive gratings. At the end of these collecting gratings, each being responsible for a certain transverse angle, a collection of receivers is placed with each one receiving a copy of the local oscillator. The phases of the local oscillator delivered to each receiver unit can be adjusted with a phase shifter, but this is not necessary. If the branches of the local oscillator delivered to all receivers are not synced, there could be an offset in the phase of the RF signals generated at each receiver. As the receivers in this case are independent from each other and each is responsible for a certain angle, the phase of the generated RF signal does not have a significance in many heterodyne or homodyne.

Figure 17:
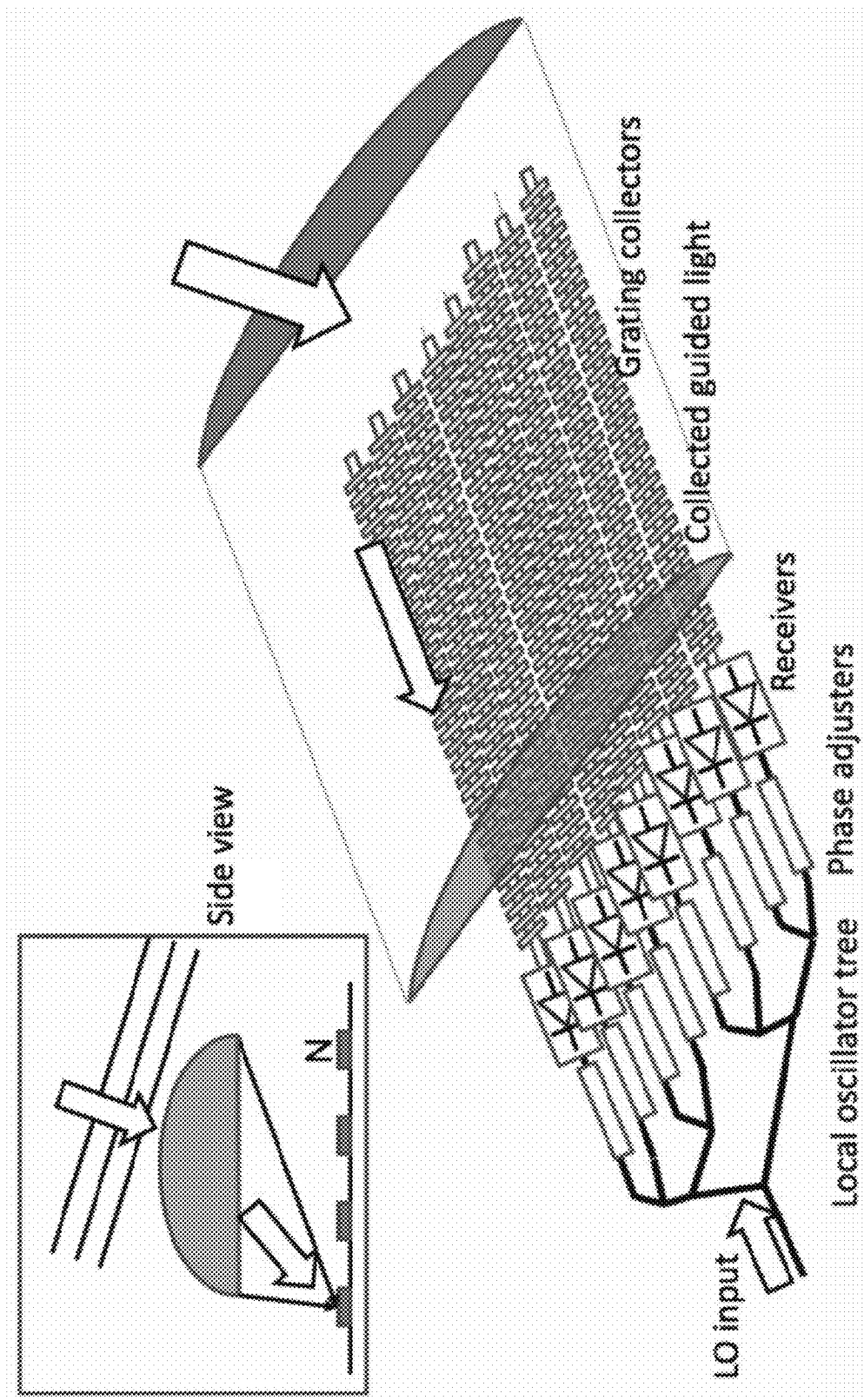
FIG. 17 is a schematic diagram of an illustrative configuration showing that a lens positioned before the collecting array of gratings directs the incoming plane waves to individual gratings and an inset showing cross-sectional view of the grating collectors and the lens according to aspects of the present disclosure.

As can be seen from the inset of FIG. 17, the light coming from a target at a large angle will be focused on a grating antenna more to the side of the focal plane array. This poses two challenges for efficient collection. The first challenge— like what we already discussed with respect to FIG. 14—is the curvature of the image field and the fact that the side gratings gradually move out of focus. The second challenge is that the angle of incidence of the focused beams unto the waveguide. The grating emitters have a radiation gain pattern that possibly rolls off as the angle of incidence up increases.

As can be seen from the FIG. 17 inset, this angle increases as the light is focused on the elements on the sides of the focal plane array. These issues can be corrected by moving to a telecentric configuration, adding more lenses to the simple lens used in FIG. 17 by placing micro-lenses on top of the grating emitter.

At this point those skilled in the art will readily appreciate that light traversing the incoming waveguides (incoming waveguide mode) are directed into the slab waveguide (slab mode propagation) where it undergoes the effect of the planar lens. Consequently, and according to aspects of the present disclosure, such affected light will exhibit a hyperbolic-shaped phase front (or any desired focusing phase front) and be directed in the slab to the output waveguides where it subsequently exits the overall structure. As will be appreciated by those skilled in the art, a length of the planar or waveguide lens, through which any focusing wavefront propagates will be at least as long as the focus point length of the focusing wavefront.

As will now be readily appreciated by those skilled in the art, systems and structures—and methods employing same—according to aspects of the present disclosure—may advantageously be integrated on a chip such as a silicon photonics based chip with embedded or external photodetectors (that may be Silicon, Germanium, InGaAs, HgCdTe, or other).

Of further advantage, CMOS-compatible materials and methods as are known in the art are perfectly suited to fabricate structures and circuits consistent with the present disclosure. Such circuits may advantageously include silicon and/or silicon nitride and/or silicon dioxide. Other alternative materials, methods, and structures consistent with aspects of the present disclosure include glass-based or III/V based platforms as well.

Finally, we note that receiver structures employed may include an array of single-ended detectors, balanced detectors (2 photodiodes), or IQ detectors (2 balanced detectors with 4 detectors total). As will be understood and appreciated by those skilled in the art, balanced/IQ detectors may use 180° hybrids or an array of quadrature receivers using 90° hybrids or a combination thereof. Lastly, we note that an illustrative structure such as that illustrated in FIG. 2—while each collector structure is presented as a single antenna— those skilled in the art will understand and appreciate that multiple antennas—optically coherently combined with passive or active phase shifter elements to increase the antenna gain at the cost of a larger spacing between receivers and an increase in power budget. Similarly, multiple emitting antennas may be employed to increase—for example—antenna gain and reduce field of view.

At this point, while we have presented this disclosure using some specific examples, those skilled in the art will recognize that our teachings are not so limited. Accordingly, this disclosure should be only limited by the scope of the claims attached hereto.

The invention claimed is:

1. An optical device comprising:
an emitter structure configured to emit optical radiation into an interrogation region;
a plurality of collector structures configured to collect the emitted optical radiation, backscattered from objects located in the interrogation region;
an optical Fourier transform structure that projects a Fourier transform of the collected optical radiation from two or more of the plurality of collector structures; and
a plurality of receiver structures, each receiver structure configured to receive a portion of the transformed optical radiation.

2. The optical device according to claim 1 wherein the Fourier transform structure is configured to impart a focusing phase front on the collected backscattered optical radiation.

3. The optical device according to claim 2 wherein the Fourier transform structure is configured to impart a hyperbolic phase front on the collected backscattered optical radiation.

4. The optical device according to claim 2 wherein the Fourier transform structure includes a slab waveguide.

5. The optical device according to claim 4 wherein the Fourier transform structure includes a planar lens, formed on a surface of the slab waveguide wherein said planar lens imparts the focusing phase front.

6. The optical device according to claim 2 wherein the Fourier transform structure includes a waveguide-based lens that imparts the focusing phase front.

7. The optical device according to claim 6 wherein the focusing phase front is imparted by at least one waveguide characteristic selected from the group consisting of: waveguide path length, waveguide material, waveguide geometry, and actively induced index change.

8. The optical device according to claim 2 further including a propagation region after the impart of the focusing phase front wherein a length of the propagation region is at least as long as the focusing length of the phase front.

9. The optical device according to claim 1 wherein the Fourier transform structure includes a plurality of input waveguides, a plurality of output waveguides, and a slab waveguide interposed between the input waveguides and the output waveguides wherein each individual one of the input waveguides is respectively coupled to an individual one of the plurality of collector structures and each individual one of the output waveguides is respectively coupled to an individual one of the receiver structures.

10. The optical device according to claim 9 wherein the Fourier transform structure is configured to impart a focusing phase front on the collected backscattered optical radiation.

11. The optical device according to claim 10 wherein the Fourier transform structure includes a planar lens formed on a surface of the slab waveguide.

12. The optical device according to claim 10 wherein the Fourier transform structure includes a waveguide-based lens that imparts the focusing phase front.

13. The optical device according to claim 12 wherein the focusing phase front is imparted by at least one waveguide characteristic selected from the group consisting of: waveguide path length, waveguide material, waveguide geometry, and actively induced index change.

14. The optical device according to claim 9 wherein the Fourier transform structure is configured to impart a hyperbolic phase front on the collected backscattered optical radiation.

\* \* \* \* \*